United States Patent
Buchbinder et al.

(10) Patent No.: US 9,981,262 B2
(45) Date of Patent: May 29, 2018

(54) PROCESS FOR CONTROLLING AN IONIC LIQUID CATALYST REGENERATION USING A CONDUCTIVITY MEASUREMENT

(71) Applicant: UOP LLC, Des Plaines, IL (US)

(72) Inventors: Avram Michael Buchbinder, Chicago, IL (US); Susie C. Martins, Carol Stream, IL (US)

(73) Assignee: UOP LLC, Des Plaines, IL (US)

( * ) Notice: Subject to any disclaimer, the term of this patent is extended or adjusted under 35 U.S.C. 154(b) by 910 days.

(21) Appl. No.: 14/228,615

(22) Filed: Mar. 28, 2014

(65) Prior Publication Data
US 2015/0276645 A1    Oct. 1, 2015

(51) Int. Cl.
| G05B 21/00 | (2006.01) |
| B01J 38/48 | (2006.01) |
| B01J 31/02 | (2006.01) |
| B01J 31/40 | (2006.01) |

(52) U.S. Cl.
CPC ........... *B01J 38/48* (2013.01); *B01J 31/0277* (2013.01); *B01J 31/40* (2013.01); *B01J 2231/32* (2013.01)

(58) Field of Classification Search
CPC .................................................. G05B 21/00
USPC ........... 422/68.1, 129; 700/266, 268; 436/43
See application file for complete search history.

(56) References Cited

U.S. PATENT DOCUMENTS

| | | | |
|---|---|---|---|
| 6,573,405 B1 * | 6/2003 | Abbott | C07B 37/04 564/292 |
| 7,674,739 B2 | 3/2010 | Elomari et al. | |
| 8,142,725 B2 | 3/2012 | Hommeltoft et al. | |
| 2010/0065476 A1 * | 3/2010 | Hommeltoft | C10G 29/205 208/108 |
| 2010/0129921 A1 | 5/2010 | Timken et al. | |
| 2011/0184219 A1 | 7/2011 | Timken et al. | |
| 2011/0275876 A1 * | 11/2011 | Hommeltoft | C10G 29/205 585/701 |
| 2011/0319694 A1 | 12/2011 | Timken et al. | |
| 2012/0296145 A1 | 11/2012 | Lacheen | |
| 2013/0338389 A1 | 12/2013 | Dai et al. | |
| 2014/0005459 A1 | 1/2014 | Zhan et al. | |
| 2015/0030524 A1 * | 1/2015 | Jl | C01B 32/50 423/437.1 |
| 2016/0096784 A1 * | 4/2016 | Jl | C01B 32/50 585/802 |

OTHER PUBLICATIONS

Tshibangu, et al., "Density, Viscosity, and Conductivity Study of 1-Butyl-3-Methylimidazolium Bromide," Int. Journal of Electrochemical Science (2011), vol. 6, 2201-2213.

Vila, et al. "Temperature Behavior of the Electrical Conductivity of Emim-Based . . . " Portugaliae Electrochimica Acta (2007), vol. 25, 163-172.

* cited by examiner

*Primary Examiner* — Brian J. Sines

(57) ABSTRACT

A process in which the conductivity of an ionic liquid catalyst used in a continuous reaction process is measured in order to determine the amount of conjunct polymer associated with the ionic liquid catalyst. The conductivity may be used to control: an amount of spent ionic liquid catalyst passed back to the reaction zone; an amount of spent ionic liquid catalyst passed to a regeneration zone; an amount of spent ionic liquid catalyst removed from the continuous reaction process; an amount of fresh ionic liquid catalyst passed to the reaction zone; an amount of regenerated ionic liquid catalyst passed to the reaction zone; or combinations thereof.

13 Claims, 1 Drawing Sheet

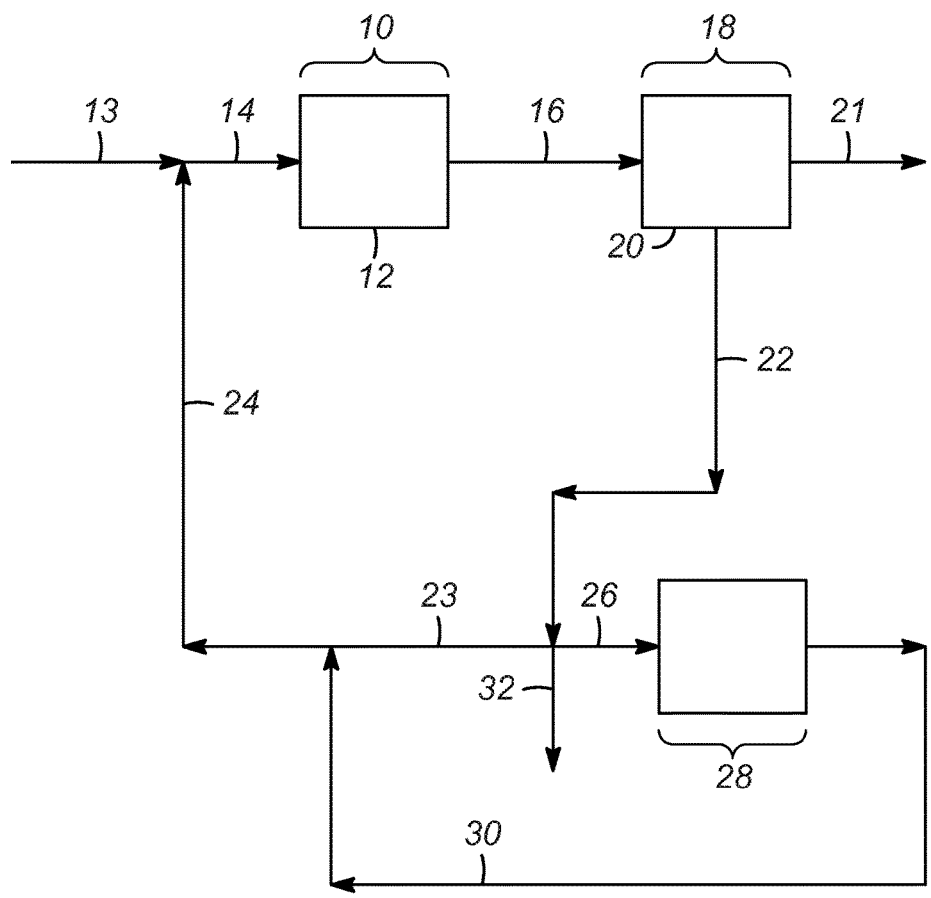

PROCESS FOR CONTROLLING AN IONIC LIQUID CATALYST REGENERATION USING A CONDUCTIVITY MEASUREMENT

BACKGROUND OF THE INVENTION

Acidic ionic liquid may be used as a catalyst in various chemical reactions, such as for the alkylation of isobutane with olefins. A by-product of this reaction is the accumulation, over time, of conjunct polymer in the liquid catalyst. As would be appreciated, conjunct polymer is typically highly conjugated, olefinic, highly cyclic hydrocarbons that form as a byproduct of various hydrocarbon conversion processes, including but not limited to alkylation, oligomerization, isomerization, and disproportionation.

Due to the olefinic and diolefinic functionality of conjunct polymer, it has a strong affinity for the ionic liquid catalyst. This results in the catalyst losing acidity as the amount of conjunct polymer in ionic liquid catalyst increases. If acidity of the ionic liquid catalyst is reduced, the effectiveness of the catalyst in the reaction zone will be reduced as well.

Used (or spent) ionic liquid catalyst containing some conjunct polymer is typically recycled back into the reaction zone and a slip stream is typically diverted to a regeneration zone, in order to maintain a constant level of catalyst activity.

The ionic liquid catalyst can be regenerated by several processes. However, it still must be determined if all or a portion of the ionic liquid catalyst should be regenerated or if all or a portion of the ionic liquid catalyst can be recycled back to the reaction zone.

Accordingly, it is known to determine the amount of conjunct polymer in spent ionic liquid catalyst.

For example, U.S. Pat. Pub. No. 2010/0129921 discloses a process in which an amount of conjunct polymer in the ionic liquid phase is measured with an offline titration method.

However, this method relies upon an offline determination, which requires sampling and analysis time, introducing a delay time and slowing the response to process changes, and diminishing the ability to control and monitor the process.

It is also known to predict the effectiveness of the ionic liquid catalyst based upon other factors.

For example, U.S. Pat. No. 8,142,725 discloses a method in which the amount of chloride in a hydrocarbon effluent stream is monitored and used as a basis to determine catalyst acidity. In this method, the amount of chloride is measured using conductivity.

Additionally, U.S. Pat. Pub. No. 2012/0296145 discloses a process in which an amount of conjunct polymer in the ionic liquid phase is measured using infrared spectroscopy.

These methods rely on a measurement processes that take time, processes that are run offline, processes that are susceptible to providing misleading data based upon other variables, or a combination thereof.

Therefore, it would be beneficial and desirable to have a process in which the amount of conjunct polymer in the ionic liquid is more quickly determined in order to better control the used catalyst removal and regeneration rate.

SUMMARY OF THE INVENTION

It has been discovered that conductivity of the ionic liquid can be used to determine the amount of conjunct polymer in the ionic liquid. As the amount of the conjunct polymer in the ionic liquid increases, the conductivity will decrease.

In one embodiment of the present invention, the present invention provides a process for monitoring an ionic liquid catalyst in a continuous reaction process in which an effluent from a reaction zone is separated into a light fraction and a heavy fraction, the heavy fraction including spent ionic liquid catalyst, a conductivity of the spent ionic liquid catalyst is measured, and, at least one of the following is controlled based upon the conductivity of the spent ionic liquid catalyst: an amount of spent ionic liquid catalyst passed back to the reaction zone; an amount of spent ionic liquid catalyst passed to a regeneration zone; an amount of regenerated ionic liquid catalyst passed to the reaction zone; an amount of fresh ionic liquid catalyst passed to the reaction zone; and, an amount of spent ionic liquid removed from the continuous reaction process.

It is contemplated that a reaction is performed in the presence of ionic liquid catalyst to form the effluent, wherein the reaction is performed in the reaction zone. The reaction may be an alkylation reaction, an oligomerization reaction, an isomerization reaction, or a disproportionation reaction.

It is further contemplated that all of the following are controlled based upon the conductivity of the heavy fraction: the amount of spent ionic liquid catalyst passed back to the reaction zone; the amount of spent ionic liquid catalyst passed to the regeneration zone; the amount of regenerated ionic liquid catalyst passed to the reaction zone; the amount of fresh ionic liquid catalyst passed to the reaction zone; and, the amount of spent ionic liquid removed from the continuous reaction process.

It is contemplated that the conductivity is measured in an online measurement. Additionally, it is contemplated that the measurement is repeated.

It is also contemplated that a temperature of the spent ionic liquid is measured and at least one of the following is controlled based upon the conductivity of the spent ionic liquid catalyst and the temperature of the spent ionic liquid catalyst: the amount of spent ionic liquid catalyst passed back to the reaction zone; the amount of spent ionic liquid catalyst passed to the regeneration zone; the amount of regenerated ionic liquid catalyst passed to the reaction zone; the amount of fresh ionic liquid catalyst passed to the reaction zone; and, the amount of spent ionic liquid removed from the continuous reaction process.

It is contemplated that a desired conductivity range of the spent ionic liquid catalyst is maintained.

It is further contemplated that at least a portion of the spent ionic liquid catalyst is contacted with a probe which measures the conductivity of the spent ionic liquid catalyst. The portion of the spent ionic liquid catalyst that has contacted the probe may be returned back to the continuous process.

It also contemplated that a portion of a regenerated ionic liquid catalyst is contacted with a second probe and a conductivity of the regenerated ionic liquid catalyst is measured. The second probe used to measure the conductivity of the regenerated ionic liquid catalyst and the probe used to measure the conductivity of the spent ionic liquid catalyst may be the same probe or different probes.

It is contemplated that measuring the conductivity of the spent ionic liquid catalyst may be repeated so long as the reaction is being performed.

It is further contemplated that the conductivity of the spent ionic liquid catalyst is measured in a line or vessel which includes regenerated ionic liquid catalyst.

In another embodiment of the present invention, the present invention provides a process for monitoring a catalyst in a continuous alkylation process in which an alkylation reaction is performed in the presence of an ionic liquid catalyst to form an effluent, the effluent is separated into a light fraction and a heavy fraction, the heavy fraction comprising spent ionic liquid catalyst, a conductivity of the spent ionic liquid catalyst is measured, a portion of the spent ionic liquid catalyst is returned to the alkylation reaction, and, a desired conductivity range of the spent ionic liquid catalyst is maintained.

It is contemplated that the portion of the spent ionic liquid catalyst returned to the alkylation reaction is lowered if the conductivity of the spent ionic liquid catalyst is below the desired conductivity level or range.

Additionally, it is also contemplated that a fresh ionic liquid catalyst, a regenerated ionic liquid catalyst, or both are passed to the alkylation reaction if the conductivity of the spent ionic liquid catalyst is below the desired conductivity level or range.

Once again, it is contemplated that the conductivity is measured online.

It is also contemplated to determine an amount of conjunct polymer in the spent ionic liquid catalyst by performing an offline test which may be a titration of the spent ionic liquid catalyst, a weight or volume measurement of conjunct polymer isolated from the spent ionic liquid catalyst, infrared spectroscopy of the spent ionic liquid catalyst, gas chromatography of conjunct polymer isolated from the spent ionic liquid catalyst, nuclear magnetic resonance of the spent ionic liquid catalyst; and combinations thereof.

It is further contemplated that a portion of the spent ionic liquid catalyst is passed, to a regeneration zone to provide a regenerated ionic liquid catalyst.

Furthermore, it is also contemplated that at least a portion of the spent ionic liquid catalyst is contacted with a probe which measures the conductivity of the spent ionic liquid catalyst and, the portion of the spent ionic liquid catalyst that has contacted the probe is returned back to the continuous alkylation process.

Additional objects, embodiments, and details of the invention are set forth in the following detailed description of the invention.

DETAILED DESCRIPTION OF THE DRAWINGS

The FIGURE shows a process for monitoring a spent ionic liquid catalyst according to one or more embodiments of the present invention.

DETAILED DESCRIPTION OF THE INVENTION

A process has been discovered in which the conductivity of spent ionic liquid catalyst is measured in order to determine the amount of conjunct polymer associated with same. If, for example, the conductivity is at or above a predetermined amount (indicating an amount of conjunct polymer is at an acceptable level), the spent ionic liquid catalyst may be recycled back to the reactor. If, however, the conductivity is below the predetermined amount (indicating that the amount of conjunct polymer is too high), the spent ionic liquid catalyst may be removed from the process, preferably passed to a regeneration zone.

As used herein, "fresh ionic liquid catalyst" is used to refer to ionic liquid catalyst that has not been used as a catalyst in any reaction process. Finally, as used herein, "regenerated ionic liquid catalyst" is used to refer to ionic liquid catalyst which is removed from a regeneration zone. As used herein, "spent ionic liquid catalyst" is used to refer to ionic liquid catalyst removed from a reaction zone that includes conjunct polymer and which has not been passed to a regeneration zone and which may include regenerated ionic liquid catalyst that has been reused in the reaction process as a catalyst.

Therefore, with reference to the FIGURE, a process according to one or more embodiments of the present invention relates to a continuous reaction of compounds introduced into a reaction zone 10, preferably having a vessel 12.

It is contemplated that the reaction is a hydrocarbon conversion reaction, and in a preferred embodiment, the reaction is a continuous alkylation process. In a continuous alkylation process, an iso-paraffin, such as isobutane, is contacted with the ionic liquid catalyst in a mixing zone, resulting in an ionic liquid catalyst/hydrocarbon emulsion. Olefins such as butenes are fed into the emulsion and react to form alkylated products, primarily isooctane and other trimethylpentanes if the paraffin contains four carbons and the olefin contains four carbons. The emulsion is then separated into a heavy portion containing spent ionic liquid catalyst and a light portion containing the iso-paraffin and products. Separation of the two portions may occur by gravity, by coalescing, by both, or by otherwise recovering the droplets of spent ionic liquid catalyst.

In a most preferred embodiment, the reaction is a continuous alkylation of isobutane with olefins to form predominately isooctane and other trimethylpentanes. However, it will be appreciated that the present invention is not limited to only the preferred reaction and that other reactions, including oligomerization, isomerization, and disproportionation reactions can be utilized with the various embodiments of the present invention.

Returning to the FIGURE, also introduced into the reaction zone 10 via a line 14 is a catalyst for the reaction. The catalyst is an ionic liquid catalyst. Since the process may be a continuous process, at the start of the process, or at other times based upon other parameters and in order to at last maintain the same amount of ionic liquid catalyst in the process, fresh ionic liquid catalyst may introduced via a line 13.

An effluent is passed via a line 16 from the reaction zone 10 to a separation zone 18. The separation zone 18 preferably includes at least one vessel 20. Although not shown, it is contemplated that more than one vessel 20 is present in the separation zone 18. Each vessel 20 may be empty or, alternatively it may have equipment.

In the vessel 20 of the separation zone 18, the effluent separates into a light fraction and a heavy fraction. This separation may occur as a result of the different densities or by other means such as coalescing ionic liquid droplets. The light fraction may comprise the desired product from the reaction, and may also comprise various other byproducts of the reaction and may also comprise un-reacted reactants for the reaction and solvent for the reaction. The heavy fraction comprises spent ionic liquid catalyst.

The light fraction may be recovered from the separation zone 18 via a line 21 and processed, stored, or both. The details of the product recovery are not necessary for one of ordinary skill in the art to understand or practice the present invention.

The spent ionic liquid catalyst is returned to the reaction zone 10, for example, via lines 22, 23, 24. As shown, the spent ionic liquid catalyst can be combined with fresh ionic liquid catalyst in line 13 and returned via line 14 to the reaction zone 10. At least a portion of the spent ionic liquid catalyst may also be passed via a line 26 to a regeneration zone 28. As will be discussed in more detail below, in the regeneration zone 28, at least some of the conjunct polymer is removed from the spent ionic liquid catalyst to provide a regenerated ionic liquid catalyst. The regenerated ionic liquid catalyst may be passed via a line 30 back to the reaction zone 10.

As shown in the FIGURE, regenerated ionic liquid catalyst is passed into the line 23 passing spent ionic liquid catalyst back to the reaction zone 10. Finally, it is also contemplated that spent ionic liquid catalyst may be removed from the process, for example, via a drag stream 32. It should be appreciated and understood that this is merely a simplified and exemplarily design and that other designs could be utilized.

As long as the level of conjunct polymer in the spent ionic liquid catalyst is low enough that the effectiveness of the ionic liquid catalyst is not greatly negatively impacted, the spent ionic liquid catalyst may be recycled back to the reaction zone 10 and reused as a catalyst in the reaction zone 10. The present invention is directed to determining the amount of conjunct polymer in the ionic liquid catalyst by measuring the conductivity of the heavy fraction.

Accordingly, a conductivity of the spent ionic liquid catalyst is measured, preferably with a probe. In a most preferred embodiment, the probe is used online, meaning that the probe is either disposed (i.e., located) within any of lines used to pass spent ionic liquid catalyst back to the reaction zone 10, for example, lines 22, 23, 24 or disposed within a vessel in any of the lines, for example lines 22, 23, 24, used to pass spent ionic liquid to the reaction zone 10, or disposed within the vessel 20 of the separation zone 18. The probe may be disposed in the line 26 used to pass spent ionic liquid catalyst to the regeneration zone 26, or in the draw line 32 for removing spent ionic liquid catalyst from the process. Additionally, the probe may be used in the line 30 passing regenerated ionic liquid catalyst back to the reaction zone 10.

It is also contemplated, that the probe is disposed so that it measures the conductivity of the spent ionic liquid catalyst at the bottom of the vessel 20 in the separation zone 18.

The probe is preferably a platinum electrode probe or a toroidal conductivity probe. The type of probe may be chosen based on its detection limit, the conductivity of the ionic liquid in use, the materials of construction, and their compatibility with the ionic liquid catalyst. For instance, toroidal conductivity probes have an advantage of not contacting the ionic liquid catalyst. However, most toroidal conductivity probes have detection limit of 1 millisiemen or more. Therefore, if the spent ionic liquid is expected to have a conductivity below 1 millisiemen, a platinum electrode probe rather than a toroidal probe may be preferable.

Furthermore, since resistance is inversely related to conductivity, it is also contemplated that the resistance of the spent ionic liquid catalyst is measured with a probe. As will be appreciated by those of ordinary skill in the art, by measuring the resistance, the conductivity will also be measured. Therefore, in the context of the present invention, the phrase "measuring the conductivity" should be understood as measuring the conductivity, measuring the resistance, or both. It is also contemplated that more than one probe is used and that the probes are located in different positions throughout the process.

A bypass line may be used to allow the ionic liquid catalyst (fresh, spent, regenerated, or a mixture thereof) to flow around the probe in cases where the conductivity does not need to be measured, to avoid flow restrictions based upon the probe, or for other reasons that will be apparent to one of ordinary skill in the art.

It is also contemplated that more than one probe is used for example to measure conductivity of the spent ionic liquid catalyst and another probe is used to measure the conductivity of the regenerated ionic liquid catalyst to ensure that the regeneration process is achieving the desired level of removal of conjunct polymer.

For example, when the conductivity is too low, indicating a high level of conjunct polymer, a first portion of the spent ionic liquid catalyst may be recycled back to the reaction zone 10, while at the same time a second portion of the spent ionic liquid catalyst may be passed to the regeneration zone 28. Once the conductivity returns to a predetermined level, the flow of the spent ionic liquid catalyst may be adjusted accordingly so that more of the spent ionic liquid catalyst is recycled back to the reaction zone 10 and less is passed to the regeneration zone 28, or, all of the spent ionic liquid catalyst is recycled back to the reaction zone 10.

In some embodiments of the present invention, at least one of the following amounts is controlled based upon the conductivity of the heavy fraction: an amount of spent ionic liquid catalyst passed back to the reaction zone 10; an amount of spent ionic liquid catalyst passed to the regeneration zone 28; an amount of the regenerated ionic liquid catalyst passed to the reaction zone 10; an amount of fresh ionic liquid catalyst passed to the reaction zone 10; and, an amount of spent ionic liquid catalyst removed from the process, for instance via line 32. It is preferred that more than one is controlled, and most preferred that all of these are controlled based upon the conductivity and used to maintain a desired conductivity. The control can be continuous or at specific intervals.

A valve may be used to direct the flow of the spent ionic liquid catalyst. For example, the valve may direct the flow of the spent ionic liquid catalyst through line 23 to return to the reaction zone 10. Additionally and alternatively, the valve may direct the flow of the spent ionic liquid catalyst through the line 26 to the regeneration zone 28. The valve can comprise a three-way valve, or a four-way valve, or a switching valve, or a rotary valve, or comprise multiple valves, control valves, capillaries and tubes, or any other configuration which would obtain the same result as a multi-way valve.

This direction of flow from the valve may be a complete split, meaning the entire spent ionic liquid catalyst is passed either to the reaction zone 10 or to the regeneration zone 28. Alternatively, the valve may also split the flow of the spent ionic liquid catalyst so that the spent ionic liquid catalyst can be sent to both the reaction zone 10 and the regeneration zone 28 at the same time. Additionally, these amounts may vary based upon processes conditions. In this manner, the flow of the spent ionic liquid catalyst through the valve may be controlled based upon the conductivity of the spent ionic liquid catalyst and used to maintain a desired conductivity level or range for the spent ionic liquid catalyst.

It is contemplated that the valve is automatically controlled based upon conductivity and control parameters. Accordingly, the valve (or multiple valves) is preferably in communication with the probe via a computer, which controls operation of the valve(s) based upon the conductivity of the spent ionic liquid catalyst measured by the probe.

Additionally, it is further contemplated to measure the temperature of the spent ionic liquid catalyst also because the conductivity of the spent ionic liquid catalyst will change based upon the temperature. Thus, the process may be controlled based upon a combination of the measured conductivity and temperature.

Furthermore, since the conductivity of each individual system may differ, it is contemplated that a calibration curve be developed through an offline test which determines an amount of conjunct polymer in the spent ionic liquid catalyst. This measurement can be used to provide an absolute relationship between conductivity and the amount of conjunct polymer in the spent ionic liquid catalyst. By relating conductivity of spent ionic liquid catalyst to the conjunct polymer content, a calibration curve can be established for the specific process. The offline test may be a titration of the spent ionic liquid catalyst, infrared spectroscopy of the spent ionic liquid catalyst, gas chromatography of the conjunct polymer isolated from the spent ionic liquid catalyst, nuclear magnetic resonance of the spent ionic liquid catalyst, and, combinations thereof. Additionally, it is further contemplated that an amount of conjunct polymer is determined by extracting or separating the conjunct polymer, isolating the conjunct polymer, and determining the weight or volume of the isolated conjunct polymer relative to the sample of the spent ionic liquid catalyst.

An exemplary calibration curve was generated for a continuous alkylation process in which 2-butenes were contacted with tributylhexylphosphonium heptachloroaluminate ionic liquid in the presence of isobutane and 2-chlorobutane. The contacting took place in a 300 mL autoclave being stirred at 1100-1200 rpm.

The mixture was continuously transferred to a gravity separator and the spent ionic liquid catalyst was recycled to the reactor. Flow rates and feed ratios varied over the course of the reaction which took place over several days to weeks for the various samples. At the end of each run, a sample of the spent ionic liquid catalyst was collected and stored under nitrogen.

The amount of conjunct polymer in each of the spent ionic liquid catalyst samples was determined by extraction and isolation of conjunct polymer. A portion of the spent ionic liquid catalyst was mixed with water. The conjunct polymer was extracted from the ionic liquid and water mixture with hexane. The hexane layer was separated and the hexane was removed on a rotary evaporator and the mass of the isolated conjunct polymer was determined.

A contacting Pt electrode probe was used to measure the conductivity of three spent ionic liquid catalyst samples (for which an amount of conjunct polymer in each was known from isolation of the conjunct polymer, described above), as well as a fresh ionic liquid catalyst sample. The fresh ionic liquid catalyst sample had a conductivity of 0.8 mS. As shown below in Table 1, the conductivity of the spent ionic liquid catalyst samples decreased based upon the amount (by % weight) of conjunct polymer in the sample.

TABLE 1

| Sample | percent by weight of conjunct polymer | Conductivity (mS) |
| --- | --- | --- |
| Spent 1 | 11.9% | 0.15 |
| Spent 2 | 14.8% | 0.21 |
| Spent 3 | 6.2% | 0.53 |
| Fresh IL | 0.0% | 0.8 |

Once one or more calibration curves have been established, the conductivity parameters of the process may be used to control the flow of the heavy fraction. Moreover, based upon the above, it is contemplated that various calibration curves are established based upon the temperature of the heavy fraction. The calibration curve(s) may be used to determine the levels at which the amount of conjunct polymer in the heavy fraction is unacceptable.

The conductivity may be constantly measured so long as the reaction is being performed, i.e., continuously. Alternatively, the conductivity could be measured every minute, every ten minutes, or at another time interval. The measurement could also be done with a combination of the two.

Returning to the FIGURE, in the regeneration zone 28, the ionic liquid catalyst reacts with one or more compounds to remove at least a portion of the conjunct polymer from the ionic liquid catalyst.

A variety of methods for regenerating ionic liquids have been developed. The ionic liquid containing the conjunct polymer could be contacted with a reducing metal (e.g., Al), an inert hydrocarbon (e.g., hexane), and hydrogen and heated to about 100° C. The conjunct polymer will be transferred to the hydrocarbon phase, allowing for the conjunct polymer to be removed from the ionic liquid phase. See e.g., U.S. Pat. No. 7,651,970; U.S. Pat. No. 7,825,055; U.S. Pat. No. 7,956,002; and U.S. Pat. No. 7,732,363.

Another method involves contacting the ionic liquid containing the conjunct polymer with a reducing metal (e.g., Al) in the presence of an inert hydrocarbon (e.g. hexane), but in the absence of added hydrogen, and heating to about 100° C. The conjunct polymer will be transferred to the hydrocarbon phase, allowing for the conjunct polymer to be removed from the ionic liquid phase. See e.g., U.S. Pat. No. 7,674,739.

Still another method of regenerating the ionic liquid involves contacting the ionic liquid containing the conjunct polymer with a reducing metal (e.g., Al), HCl, and an inert hydrocarbon (e.g. hexane), and heating to about 100° C. The conjunct polymer will be transferred to the hydrocarbon phase, allowing for the conjunct polymer to be removed from the ionic liquid phase. See e.g., U.S. Pat. No. 7,727,925.

The ionic liquid can be regenerated by adding a homogeneous metal hydrogenation catalyst (e.g., $(PPh_3)_3RhCl$) to the ionic liquid containing the conjunct polymer and an inert hydrocarbon (e.g. hexane). Hydrogen would be introduced, and the conjunct polymer would be reduced and transferred to the hydrocarbon layer. See e.g., U.S. Pat. No. 7,678,727.

Another method for regenerating the ionic liquid involves adding HCl, isobutane, and an inert hydrocarbon to the ionic liquid containing the conjunct polymer and heating to about 100° C. The conjunct polymer would react to form an uncharged complex, which would transfer to the hydrocarbon phase. See e.g., U.S. Pat. No. 7,674,740.

The ionic liquid could also be regenerated by adding a supported metal hydrogenation catalyst (e.g. Pd/C) to the ionic liquid containing the conjunct polymer and an inert hydrocarbon (e.g. hexane). Hydrogen would be introduced and the conjunct polymer would be reduced and transferred to the hydrocarbon layer. See e.g., U.S. Pat. No. 7,691,771.

Still another method involves adding a basic reagent that displaces the conjunct polymer and is a part of the regeneration of the catalyst. The basic reagents are described as nitrogen-containing compounds such as amines, pyridinium compounds, or pyrrolidinium compounds. For example, a suitable substrate (e.g. pyridine) is added to the ionic liquid containing the conjunct polymer. After a period of time, an inert hydrocarbon would be added to wash away the liberated conjunct polymer. The ionic liquid precursor would be added to the ionic liquid heptachloroaluminate catalyst, wherein the cation of the precursor and the catalyst are the same, followed by an inert hydrocarbon. After a given time of mixing, the hydrocarbon layer would be separated, resulting in a regenerated ionic liquid. The solid residue would be converted to catalytically active ionic liquid by adding AlCl₃. See e.g., U.S. Pat. No. 7,737,067.

Another method involves adding the ionic liquid containing the conjunct polymer to a suitable substrate (e.g. pyridine) and an electrochemical cell containing two aluminum electrodes and an inert hydrocarbon. A voltage would be applied and the current measured to determine the extent of reduction. After a given time, the inert hydrocarbon would be separated, resulting in a regenerated ionic liquid. See, e.g., U.S. Pat. No. 8,524,623.

As mentioned above, it is contemplated that the amount of regenerated ionic liquid catalyst recycled back to the reaction zone 10 is controlled also based upon the conductivity of the spent ionic liquid catalyst.

The conductivity of the regenerated ionic liquid catalyst may also be measured, for example, to determine if the regeneration zone 28 is functioning efficiently, to ensure that the desired amount of conjunct polymer is being removed, at what rate the reaction is occurring, or for other reasons that would be appreciated by those of ordinary skill in the art.

As mentioned above, it is contemplated to introduce fresh ionic liquid catalyst into the reaction zone 10. This could be, for example, if the conductivity does not return to the desired level after adjustment, or to maintain an appropriate level of ionic liquid catalyst in the system, or if the ionic liquid catalyst has become contaminated or merely to maintain the proper amount of ionic liquid catalyst in the process.

One or more embodiments of the present invention provide a process that minimizes the amount of ionic liquid catalyst wasted with destructive testing.

Furthermore, one or more embodiments of the present invention provide a process that can be adjusted to measure the conductivity continuously, at intervals, or both so as to provide current conditions of the ionic liquid catalyst.

Moreover, one or more embodiments of the present invention provide a process that allows for selective control, automation of the regeneration of the ionic liquid catalyst, a process that maintains an effective level of ionic liquid catalyst by measuring and maintaining a conductivity of spent ionic liquid catalyst, or a combination thereof.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

What is claimed is:

1. A process for monitoring an ionic liquid catalyst in a continuous reaction process comprising:
   separating an effluent from a reaction zone into a light fraction and a heavy fraction, the heavy fraction comprising spent ionic liquid catalyst;
   measuring a conductivity of the spent ionic liquid catalyst;
   determining an amount of conjunct polymer in the spent ionic liquid by comparing the measured conductivity to a calibration curve relating the measured conductivity to a content of conjunct polymer in the ionic liquid catalyst, the content of conjunct polymer being measured by an independent method; and,
   controlling at least one of the following based upon the amount of conjunct polymer in the spent ionic liquid catalyst:
   an amount of spent ionic liquid catalyst passed back to the reaction zone;
   an amount of spent ionic liquid catalyst passed to a regeneration zone;
   an amount of regenerated ionic liquid catalyst passed to the reaction zone;
   an amount of fresh ionic liquid catalyst passed to the reaction zone; and,
   an amount of spent ionic liquid removed from the continuous reaction process.

2. The process of claim 1 further comprising:
   performing a reaction in the presence of ionic liquid catalyst to form the effluent, wherein the reaction is performed in the reaction zone.

3. The process of claim 2 wherein the reaction is a process selected from the group consisting of: alkylation; oligomerization; isomerization; and, disproportionation.

4. The process of claim 1 wherein all of the following are controlled based upon the amount of conjunct polymer in the spent ionic liquid catalyst:
   the amount of spent ionic liquid catalyst passed back to the reaction zone;
   the amount of spent ionic liquid catalyst passed to the regeneration zone;
   the amount of regenerated ionic liquid catalyst passed to the reaction zone;
   the amount of fresh ionic liquid catalyst passed to the reaction zone; and,
   the amount of spent ionic liquid removed from the continuous reaction process.

5. The process of claim 1 wherein measuring the conductivity comprises an online measurement.

6. The process of claim 1 further comprising:
   measuring a temperature of the spent ionic liquid; and,
   controlling at least one of the following based upon the amount of conjunct polymer in the spent ionic liquid catalyst and the temperature of the spent ionic liquid catalyst:
   the amount of spent ionic liquid catalyst passed back to the reaction zone;
   the amount of spent ionic liquid catalyst passed to the regeneration zone;
   the amount of regenerated ionic liquid catalyst passed to the reaction zone;
   the amount of fresh ionic liquid catalyst passed to the reaction zone; and,
   the amount of spent ionic liquid removed from the continuous reaction process.

7. The process of claim 1 wherein measuring the conductivity of the spent ionic liquid catalyst is repeated.

8. The process of claim 1 further comprising:
   maintaining a desired conductivity range of the spent ionic liquid catalyst.

9. The process of claim 1 further comprising:
   contacting at least a portion of the spent ionic liquid catalyst with a probe which measures the conductivity of the spent ionic liquid catalyst.

10. The process of claim 9 further comprising:
    returning the portion of the spent ionic liquid catalyst that has contacted the probe back to the continuous process.

11. The process of claim 9 further comprising:
    contacting at least a portion of a regenerated ionic liquid catalyst with a second probe; and, measuring a conductivity of the regenerated ionic liquid catalyst, wherein the probe and the second probe are the same or different.

12. The process of claim 1 further comprising:
repeating measuring of the conductivity of the spent ionic liquid catalyst so long as the reaction is being performed.

13. The process of claim 1 wherein the conductivity of the spent ionic liquid catalyst is measured in a line which includes regenerated ionic liquid catalyst.

* * * * *